J. G. EVENDEN.

Oil-Cans.

No. 5,597. Reissued Oct. 14, 1873.

Witnesses:

F. Cortez Wise

John W. Munday

Inventor:

John G. Evenden

AM. PHOTO-LITHOGRAPHIC Co. N.Y. (OSBORNE'S PROCESS)

UNITED STATES PATENT OFFICE.

JOHN G. EVENDEN, OF CHICAGO, ILLINOIS.

IMPROVEMENT IN OIL-CANS.

Specification forming part of Letters Patent No. 115,943, dated June 13, 1871; reissue No. 5,597, dated October 14, 1873; application filed August 22, 1873.

DIVISION A.

*To all whom it may concern:*

Be it known that I, JOHN G. EVENDEN, of Chicago, in the county of Cook and State of Illinois, have invented certain new and useful Improvements in Sheet-Metal Cans; and I do hereby declare the following to be a full, clear, and exact description of the same, reference being had to the accompanying drawing forming part of this specification, in which—

Figure 1:
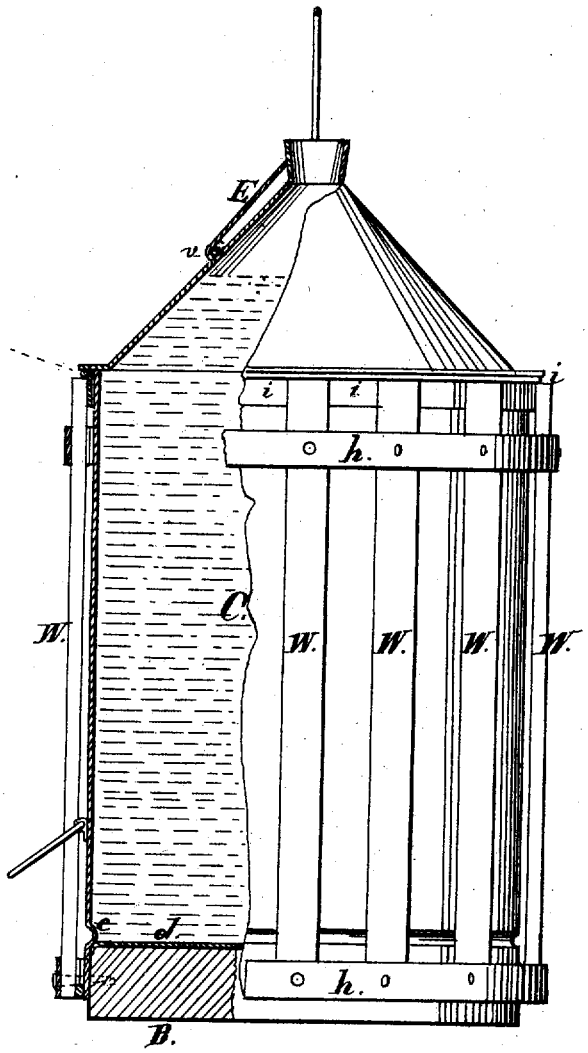
Figure 2:
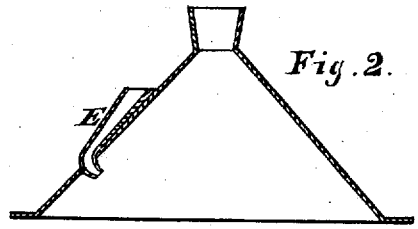

Figure 1 is a side view, a portion of the wall at the top and bottom having been broken away to reveal the construction; and Fig. 2 is a section of the top of the can, showing a modification of the air-tube.

Similar letters of reference in the drawing indicate corresponding parts.

This invention consists in an improved method of constructing and packing sheet-metal cans for transportation, as hereinafter set forth.

In the drawing, C is the body of a can constructed with a conical top and a sheet-metal bottom, *d*, supported by a wooden base, B, the sheet-metal bottom being attached to the walls about half an inch above their lower edge, so as to leave a space sufficient to receive the wooden base, as shown in Fig. 1. As the weight of the can will be supported by the wooden base, which will consequently press upward against the metal bottom, it is necessary to attach the latter to the walls in such a manner that the upward pressure will not tear it off. To this end, therefore, I raise a bead, *c*, around the inside of the wall, and, bending down the edge of the sheet-metal bottom slightly, so that it will lie flat against the under side of the bead, I apply it thereto and solder it firmly, as shown in the drawing. This method of securing the bottom gives it so much strength that in the largest cans no difficulty will be experienced from the cause referred to. The walls of the can I support by means of parallel strips W of wood, arranged vertically around it, and connected by two or more hoops, *h h*, of metal, the lower hoop being preferably nailed to the strips with long nails, which pass through the wall and project into the wooden base, so that the latter supports the weight of the strips, while the nails keep the base from dropping out when dry and shrunken. The upper ends of the strips rest against a tin hoop, *i*, heavily wired around its upper edge and soldered to the walls of the can, the ends of the strips coming firmly against the under side of the rib formed by the wire, as shown in Fig. 1.

The object of this construction is at the same time to support the walls of the can, to prevent them from wearing rapidly out, and to dispense with the use of the ordinary square boxes in which such articles are packed for transportation, each can, as constructed by me, being always securely packed and protected against rough handling.

To the breast of the can I apply an inclined air-tube, E, communicating, at its lower extremity, with the interior of the vessel, and at or near its upper extremity with the open air.

In cans which are to contain thin fluids that readily flow, such as oil, milk, &c., a ball-valve, *v*, may be employed within the tube to prevent dust, &c., from entering the can; but in cans for thick fluids, such as molasses, &c., the tube had better be made open at its upper end and tapering thence to its lower end, as shown in Fig. 2, the lower end bending in an easy curve and entering through the breast of the can, without having a sharp angle to obstruct the return of any of the liquid that may chance to get into it.

Having thus described my invention, what I claim as new therein, and desire to secure by Letters Patent, is—

1. The combination of a sheet-metal can, C, with a series of longitudinal wooden strips, W W, arranged around it with their edges parallel, but not in contact, said strips being clasped firmly against the body of the can by means of hoops *h h*, and supported by the wooden base B, substantially as and for the purposes specified.

2. The supporting-hoop *i*, constructed with the large wire at its upper edge, as described, and applied to the can, in combination with the strips W W, which rest upon it and bear against the under side of the wire or rib formed by it, substantially as and for the purposes set forth.

JOHN G. EVENDEN.

Witnesses:

F. CORTEZ WILSON,

L. L. COBURN.